United States Patent [19]

Chang

[11] Patent Number: 5,542,740
[45] Date of Patent: Aug. 6, 1996

[54] CHAIR AND HAND TRUCK

[76] Inventor: Chien I. Chang, No. 38, Bao-Chung 3rd. St., Hou-Hu, Chia-Yi City, Taiwan

[21] Appl. No.: 403,195

[22] Filed: Mar. 13, 1995

[51] Int. Cl.⁶ .................................................. A47C 13/00
[52] U.S. Cl. ........................ 297/129; 280/47.18; 280/30
[58] Field of Search ..................................... 297/129, 118, 297/53, 29; 280/30 X, 47.18 X, 47.27

[56] References Cited

U.S. PATENT DOCUMENTS

| | | | |
|---|---|---|---|
| 2,809,047 | 10/1957 | Strohmaier | 280/47.27 |
| 3,997,213 | 12/1976 | Smith et al. | 297/129 |
| 4,824,167 | 4/1989 | King | 297/129 |
| 5,062,650 | 11/1991 | Chang | 297/129 |
| 5,160,182 | 11/1992 | Chang | 297/129 |
| 5,161,811 | 11/1992 | Cheng | 297/118 |

*Primary Examiner*—Peter M. Cuomo
*Assistant Examiner*—Anthony Barfield
*Attorney, Agent, or Firm*—Jacobson, Price, Holman & Stern, PLLC

[57] ABSTRACT

A chair and hand truck comprising a seat, a cross frame and a back frame with a back cushion, the seat having hangers for pivotal members to combine the cross frame with the seat and a bolt holes for a pivotal member to combine the back frame with the seat in a right angle, the cross frame having a U-shaped rod frame and a rectangular rod frame pivotally combined together like an X, the cross frame possible to become feet of a chair or a pull rod of a hand truck when it is transformed in different ways.

3 Claims, 6 Drawing Sheets

CHAIR AND HAND TRUCK

BACKGROUND OF THE INVENTION

There are two known U.S. Pat. Nos. 5,062,650 and 5,160,182 titled "Multi-Function Chair", which have been acquired by the same applicant of this application.

This invention concerns a convertible device for use as a chair and hand truck having a different structure from the two known ones mentioned above, which is convenient for manufacture, being transformed into a chair or a hand truck or a collapsed form of a small size for putting away, and possible to keep the transformed chair or hand truck in a stable condition.

SUMMARY OF THE INVENTION

The object of this invention is to provide a more convenient and much better chair and hand truck.

The present invention of a chair and hand truck comprises a seat, a cross frame and a back frame combined together.

The main feature of the present invention is the cross frame possible to be transformed against the seat to become the feet of a chair or a pulling rod of a hand truck by means of pivotal members provided in the seat, the cross frame and the back frame.

DETAILED DESCRIPTION OF THE INVENTION

Figure 1:
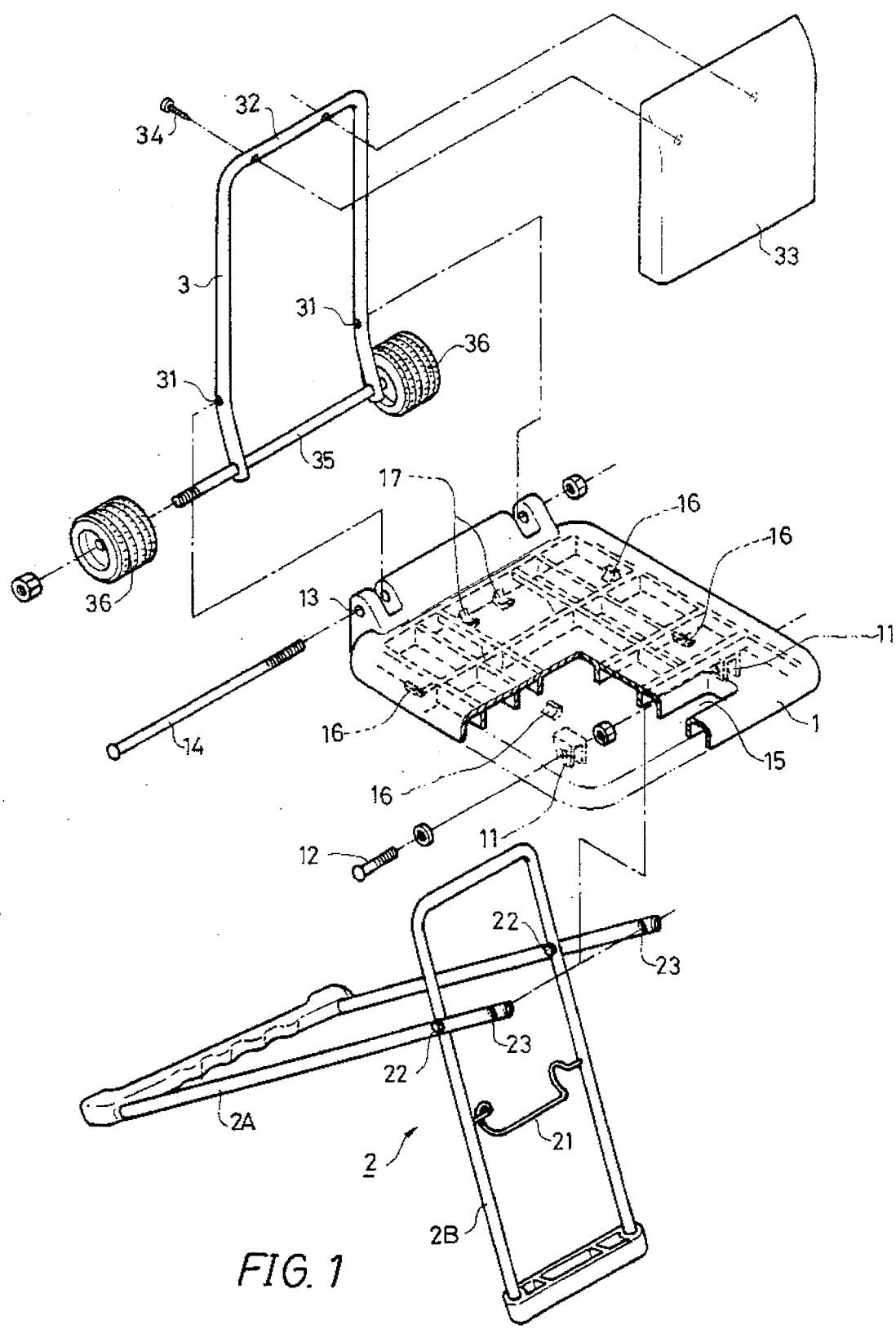
FIG. 1 is an exploded perspective view of a chair and hand truck in the present invention.

A chair and hand truck in the present invention, as shown in FIG. 1, comprises a seat 1, a cross frame 2 and a back frame 3 as main components combined together.

The seat 1 has a set of hangers 11 for a pivotal member 12 such as a pin, or a shaft to combine the cross frame 2 with the seat 1, a set of shaft holes 13 for a pivotal member 14 such as a shaft, or a threaded rod to combine the back frame 3 with the seat 1, a position hole 15 for a hook 21 of the cross frame 2 to hook with, and a plurality of retainers 16 for retaining the cross frame 2.

The cross frame 2 has a U-shaped rod frame 2A and a rectangular rod frame 2B combined together in an X shape by means of pivotal members 22. The U-shaped rod frame 2A has a longer length than that of the rectangular rod frame 2B, but a shorter width than that of the rectangular rod frame 2B. The U-shaped rod frame 2A has a hole 23 respectively near two free ends for the pivotal members 12 to combine the cross frame 2 with the hangers 11 of the seat 1, and two bottom ends standing on the ground to function as feet of a chair or as pulling rods of a hand truck. The rectangular rod frame 2B has an upper lateral rod possible to rest on supporters 17 fixed on the bottom of the seat 1, a bottom lateral rod standing on the ground to function as feet of a chair, and a long hook 21 fixed between two vertical rods to fitting in a position hole 15 of the seat 1 stably when this chair and hand truck is transformed into a hand truck. When this chair and hand truck is collapsed, both the U-shaped rod frame 2A and the rectangular rod frame 2B are held stably by the retainers 16 of the seat 1, prevented from loosening off the seat 1.

The back frame 3 is U-shaped, having a bolt hole 31 respectively in two opposite vertical rods for a pivotal bolt 14 to fit therein and also in the bolt holes 13 of the seat 1 in combining the back frame 3 with the seat 1, a lateral rod 32 having two screw holes for screws 34 to fixed a back cushion 33 on the back frame 3, a lateral shaft rod 35 fixed through each end of each of the two opposite vertical rods, and a wheel 36 respectively fixed firmly on two ends of the lateral shaft rod 35 to stand and move on the ground in case of this chair and hand truck transformed into a hand truck.

Figure 2:
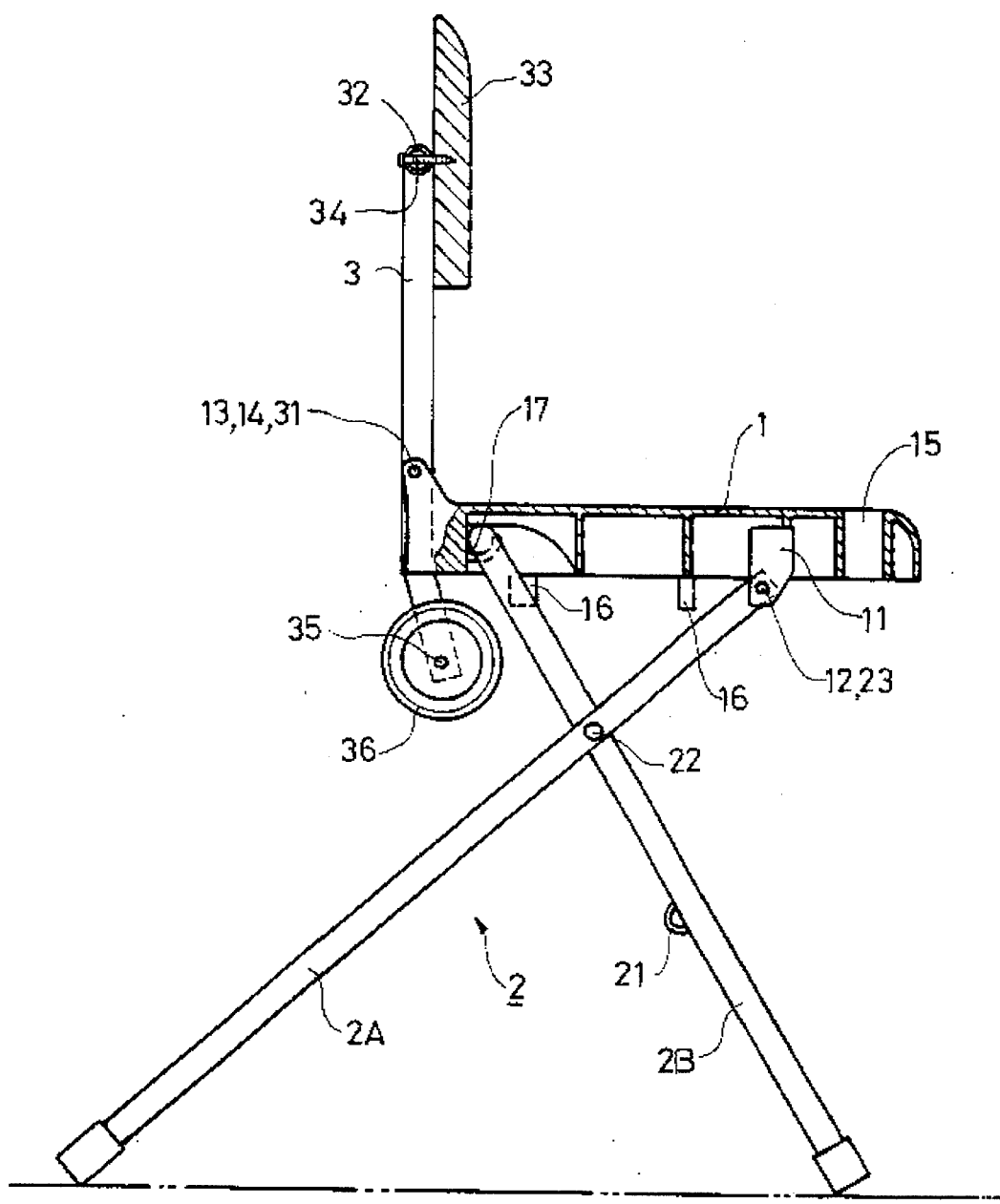
FIG. 2 is a side view of the chair and hand truck in the present invention, showing it transformed into a chair.

FIG. 2 shows this chair and hand truck is transformed into a chair, with the cross frame 2 spread crosswise in an X shape, with the bottom ends thereof standing on the ground, with an upper end of the U-shaped rod frame 2A connected with the seat 1 by means of the pivotal members 12 engaging with the hangers 11, with an upper end of the lateral rod of the rectangular rod frame 2B resting on the supporters 17. The back frame 3 is located upright to the seat 1, and the back cushion 33 is fixed with the back frame 3 vertically for the back of a user to rest thereon.

Figure 3:
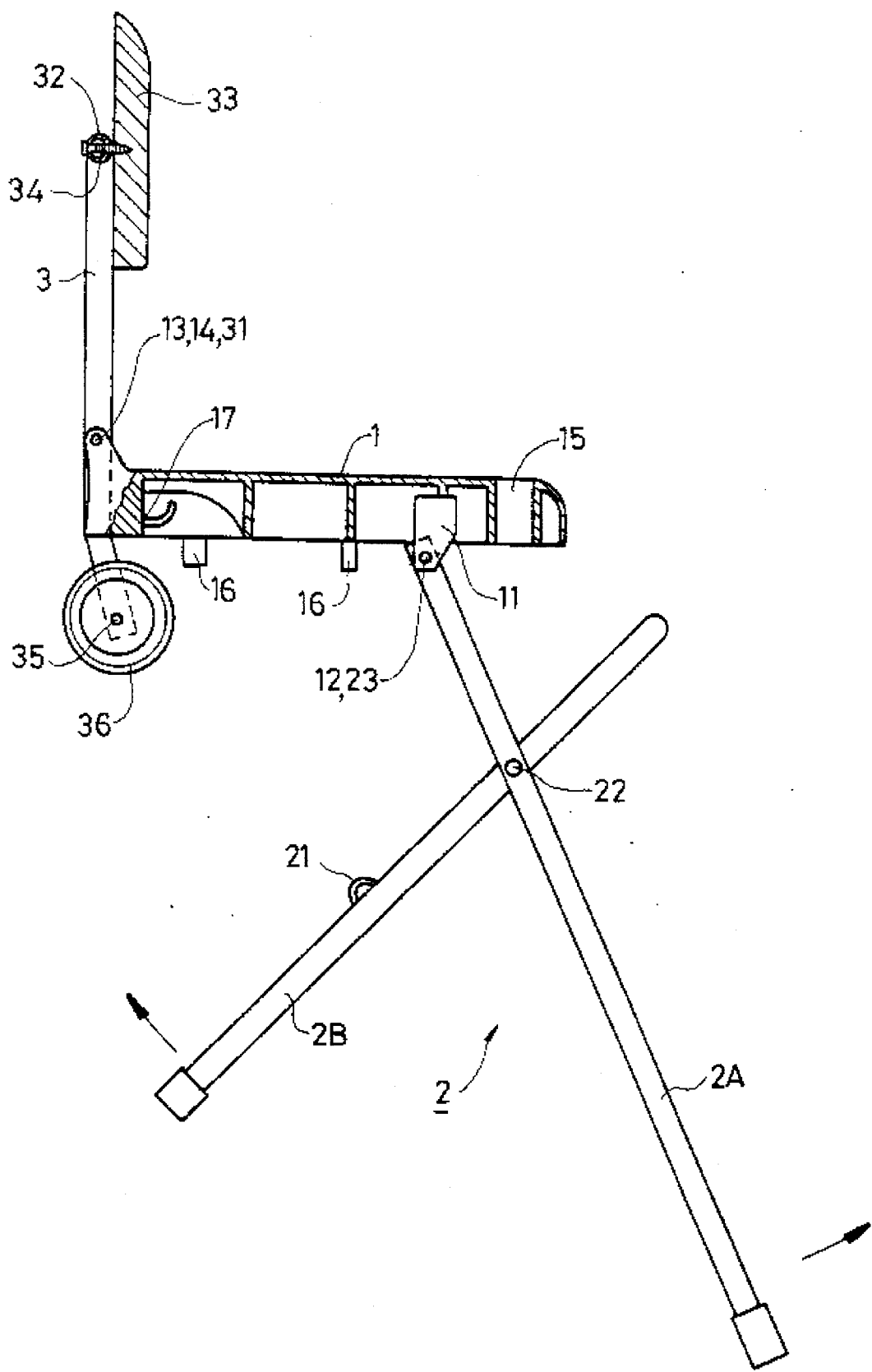
FIG. 3 is a side view of the chair and hand truck in the present invention, with a cross-frame being collapsed from the position shown in FIG. 2.
Figure 4:
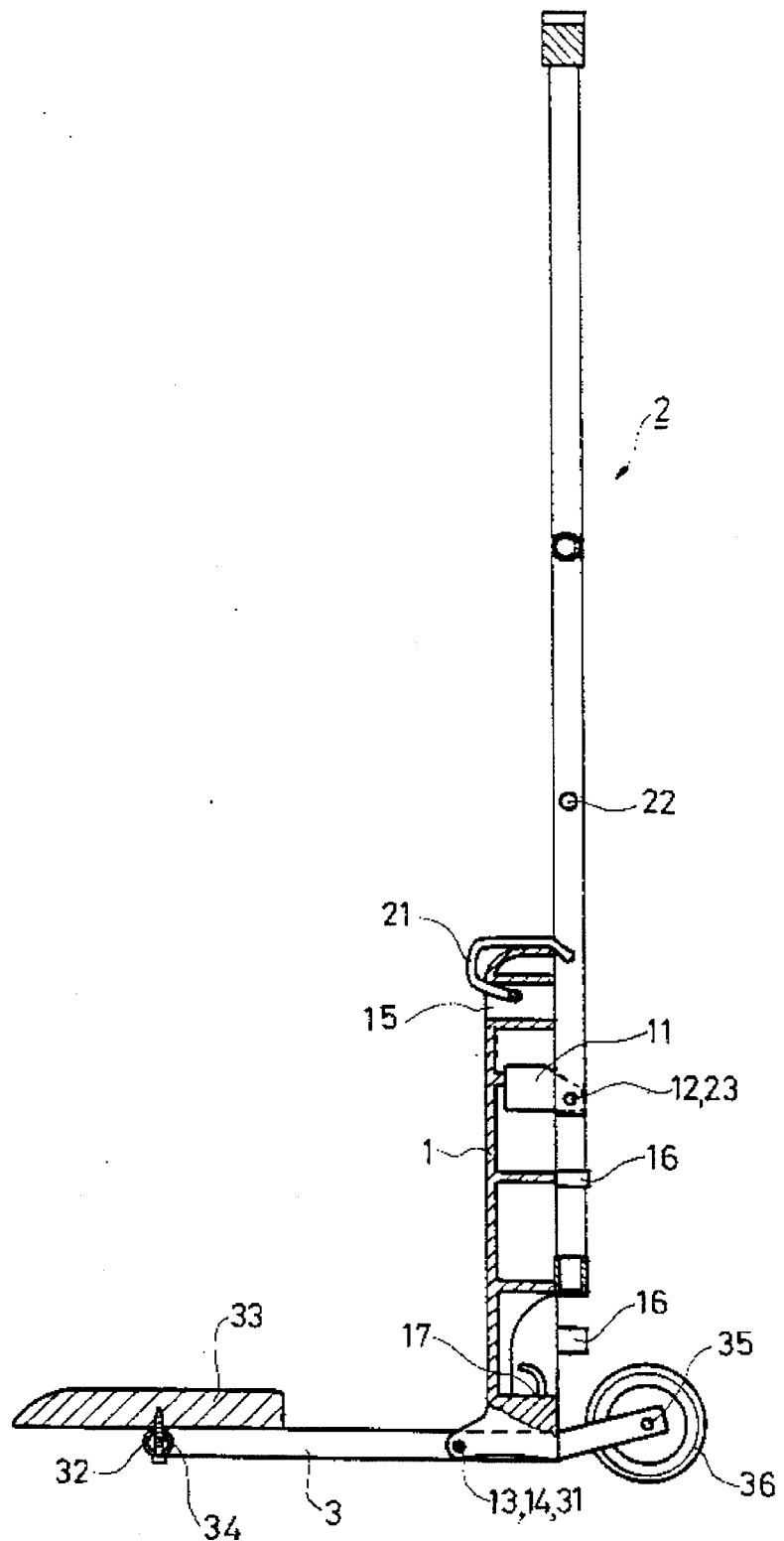
FIG. 4 is a side view of the chair and hand truck in the present invention, showing it transformed into a hand truck.
Figure 5:
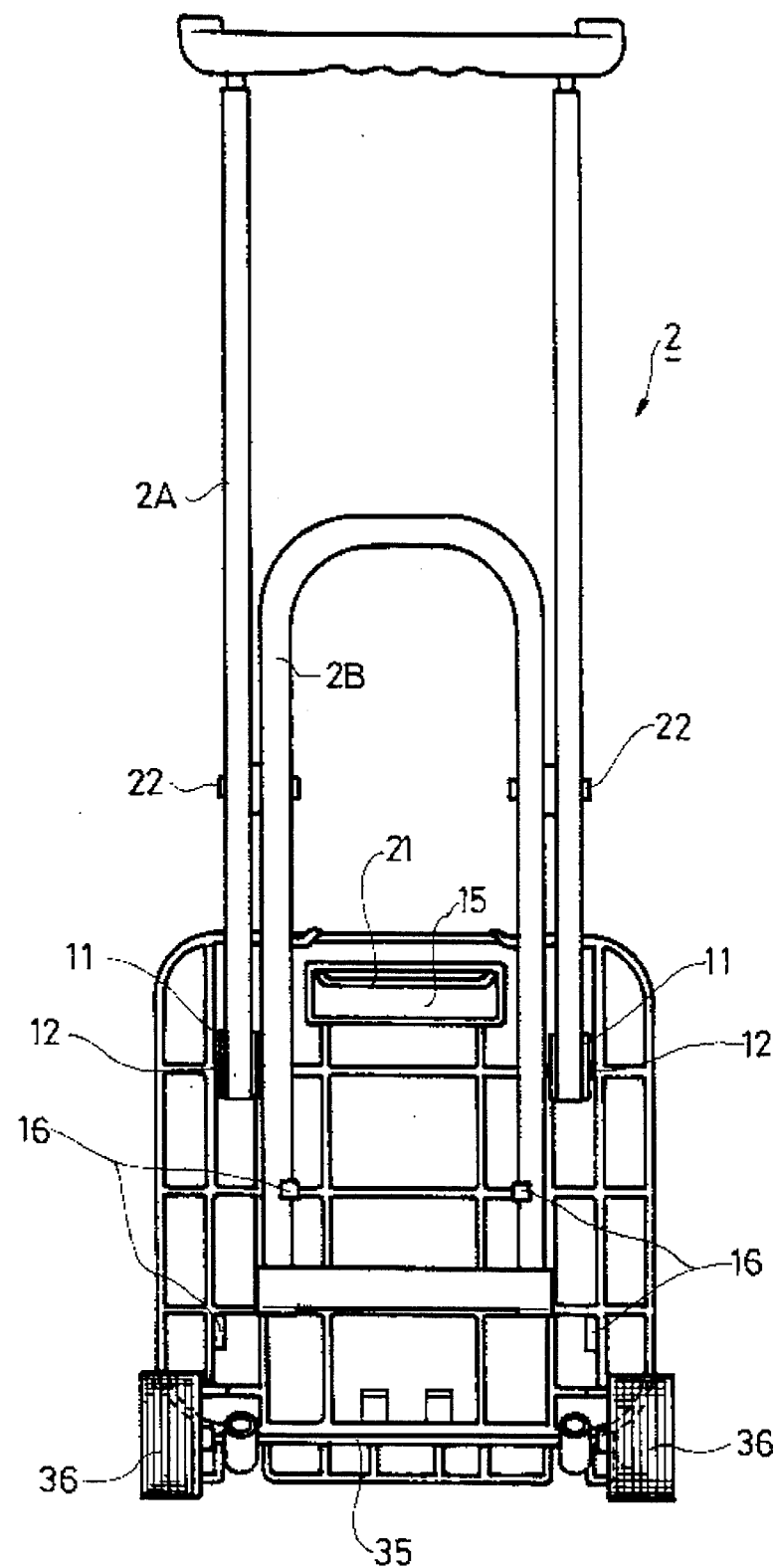
FIG. 5 is a cross-sectional view taken along line 5—5 of FIG. 4.

Referring to FIGS. 3 & 4, how to transform the chair formed with this chair and hand truck into a hand truck is shown. At first, the upper end of the rectangular rod frame 2B of the cross frame 2 is made to separate from the supporters 17, with the rectangular rod frame 2B being folded to align with the U-shaped rod frame 2A, then pushing the folded cross frame 2 against the bottom of seat 1 until the hook 21 may fit around the front of the seat and engage in the position hole 15, with the two opposite lengthwise rods of both the U-shaped rod frame 2A and the rectangular rod frame 2B engaging with the retainers 16 as shown in FIGS. 4 & 5.

Figure 6:
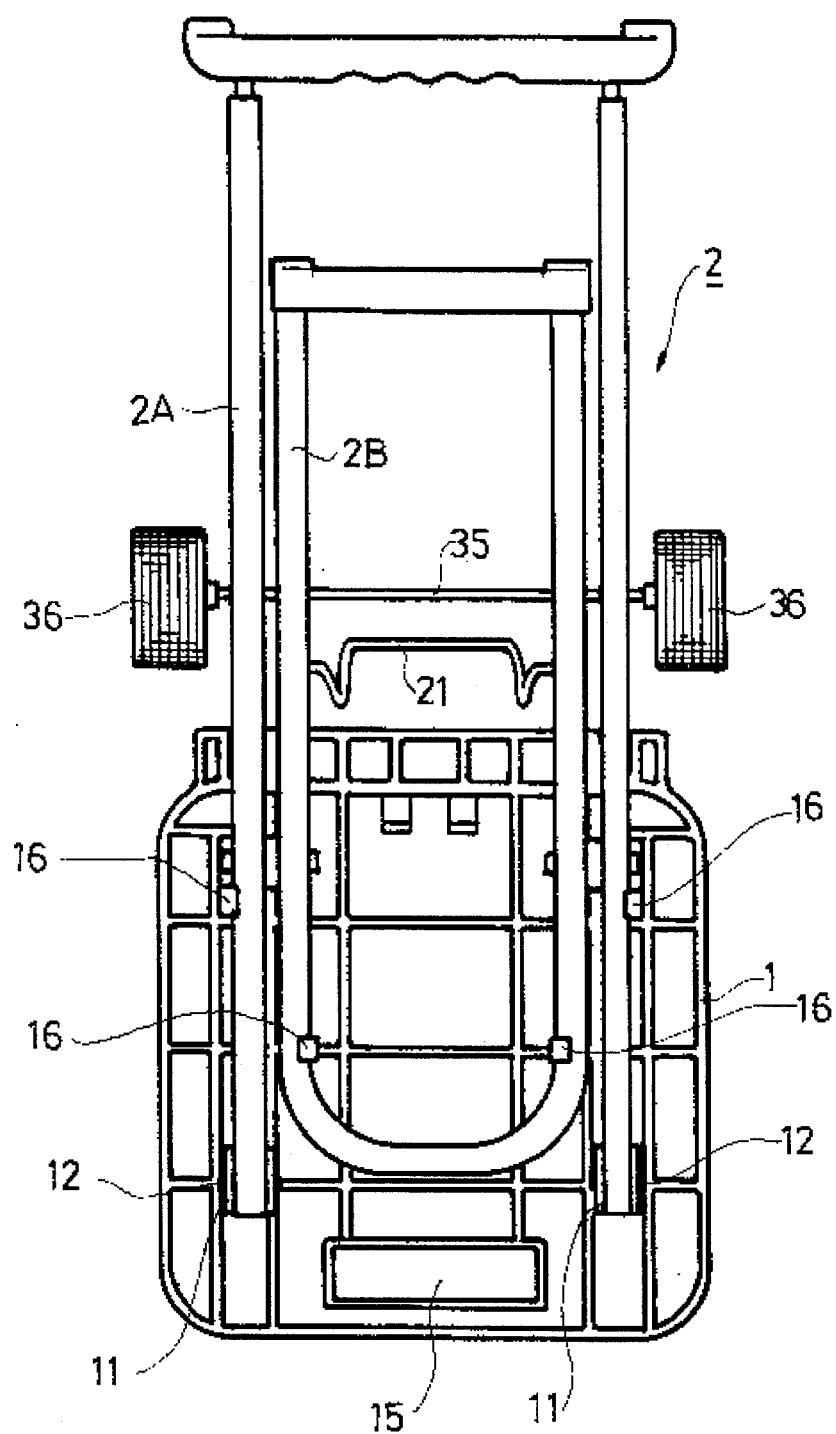
FIG. 6 is a back view of the chair and hand truck in the present invention, showing it collapsed in a small size.

FIG. 6 shows this chair and hand truck is totally collapsed to the smallest dimensions, by pushing the folded cross frame 2 toward the rear of the seat 1 until the folded cross frame 2 may rest against the bottom of seat 1. The back frame 3 is folded down on top of the seat.

This chair and hand truck has a simple structure, utilizing the hook 21 and the retainers 16 to keep the chair or the hand truck transformed in the stable condition.

What is claimed is:

1. A convertible device for use as a chair and a hand truck comprising:

a seat having a front, a back, a bottom surface and a top surface, a back frame connected to the back of the seat for pivotal movement between an open upright position perpendicular to the seat when the device is used as a chair and a hand truck and a folded position against the top of the seat for storage, the back frame having a top end provided with a backrest located above the seat when the back frame is in the open position and a bottom end provided with wheels located below the seat when the back frame is in the open position, and a cross frame comprising a relatively long U-shaped frame with upper and lower ends and a shorter rectangular frame, with upper and lower ends, said frames being pivotally interconnected at a location intermediate the upper and lower ends of each frame, the seat having hangers on said bottom surface located towards the front of the seat, the upper end of the U-shaped frame being pivotally attached to said hangers, the seat having supporters on said bottom surface at the back of the seat for retaining the upper end of the rectangular frame when the device is used as a chair with said frames located in a cruciform configuration and the lower ends of the frames forming feet for the chair, wherein, for converting the chair into a hand truck, the upper end of the rectangular frame is removable from said supporters, said frames are pivotal into a coplanar configuration, and in said coplanar configuration are swingable about said hangers toward the front of the seat and against the bottom surface of the seat, so that the lower end of the U-shaped frame forms a handle for the hand truck, the seat further having a hole adjacent the front of the seat and the rectangular frame having a hook fitting around the front of the seat and engaging in said hole when said frames are positioned against the bottom surface of the seat and the device is used as a hand truck.

2. A device as claimed in claim 1 wherein said hook is pivotally connected between opposite limbs of the rectangular frame.

3. A device as claimed in claim 1 wherein said frames in said coplanar configuration are swingable about said hangers toward the back of the seat and against the bottom surface of the seat for storage, the seat including retainers for holding the U-shaped frame against the bottom surface of the seat.

* * * * *